(12) United States Patent
Tubb et al.

(10) Patent No.: US 12,006,855 B2
(45) Date of Patent: Jun. 11, 2024

(54) MUFFLER FOR SMALL ENGINES

(71) Applicant: ORBITAL AUSTRALIA PTY LTD, Balcatta (AU)

(72) Inventors: John Howard Tubb, Befordale (AU); Geoffrey Paul Cathcart, Mount Lawley (AU); Pouria Mehrani, Darch (AU); Mario Charles Muscat, Ballajura (AU)

(73) Assignee: ORBITAL AUSTRALIA PTY LTD, Balcattawa (AU)

( * ) Notice: Subject to any disclaimer, the term of this patent is extended or adjusted under 35 U.S.C. 154(b) by 237 days.

(21) Appl. No.: 17/622,901

(22) PCT Filed: Jun. 29, 2020

(86) PCT No.: PCT/AU2020/050674
§ 371 (c)(1),
(2) Date: Dec. 27, 2021

(87) PCT Pub. No.: WO2020/257883
PCT Pub. Date: Dec. 30, 2020

(65) Prior Publication Data
US 2022/0243638 A1    Aug. 4, 2022

(30) Foreign Application Priority Data

Jun. 28, 2019    (AU) .................................. 2019902267

(51) Int. Cl.
*B64D 27/04*    (2006.01)
*B64C 39/02*    (2023.01)
(Continued)

(52) U.S. Cl.
CPC ........ *F01N 13/1811* (2013.01); *B64C 39/024* (2013.01); *B64D 27/04* (2013.01);
(Continued)

(58) Field of Classification Search
CPC .... F01N 13/1811; F01N 1/02; F01N 13/1822; F01N 13/1833; B64D 27/04; B64D 33/06; B64U 50/11
See application file for complete search history.

(56) References Cited

U.S. PATENT DOCUMENTS 1,718,201 A * 6/1929 Brockway ............... F01N 13/06
                                                      123/44 C
5,306,184 A * 4/1994 Nakayama ............. B63H 20/26
                                                      440/89 R
(Continued)

FOREIGN PATENT DOCUMENTS

FR          840646 A    4/1939
JP        H0576659 A    3/1993
(Continued)

OTHER PUBLICATIONS

International Search Report and Written Opinion of the International Searching Authority, issued in PCT/AU2020/050674, dated Aug. 4, 2020; ISA/AU.

*Primary Examiner* — Justin M Benedik
(74) *Attorney, Agent, or Firm* — Harness, Dickey & Pierce, PLC

(57) ABSTRACT

A muffler (40) devised particularly for use with an engine of the type used on unmanned aerial vehicles (UAVs), and a UAV (10) having an engine (30) fitted with the muffler (40). The muffler (40) comprises a body (51) having an interior chamber (60). The muffler body (51) has a first end section (53) and a second end section (55). The first end section (51) is adapted for mounting onto the engine (31) by way of a first mount (81), with the interior chamber (60) in communication with an exhaust outlet of the engine (31) to receive exhaust flow therefrom. The second end section (53) is adapted to be mounted by way of a second mount (82) in a manner resisting movement with respect to the engine (31).

(Continued)

In one arrangement, the second mount (82) is configured to yieldingly resist movement with respect to the engine (30). In another arrangement, the second mount (82) is configured to mount the second end section (55) under a preload resisting movement of the second end section with respect to the engine (30).

19 Claims, 12 Drawing Sheets

(51) Int. Cl.
  *F01N 1/02*   (2006.01)
  *F01N 13/18*  (2010.01)
  *F02K 1/34*   (2006.01)
  *B64U 50/11*  (2023.01)

(52) U.S. Cl.
  CPC ............... *B64D 33/06* (2013.01); *F01N 1/02* (2013.01); *F01N 13/1822* (2013.01); *F01N 13/1833* (2013.01); *B64U 50/11* (2023.01)

(56) References Cited

U.S. PATENT DOCUMENTS

| | | | | |
|---|---|---|---|---|
| 6,346,019 | B1* | 2/2002 | Nanami | B63H 21/32 440/89 R |
| 10,344,660 | B1* | 7/2019 | Harris | F01N 1/04 |
| 2019/0024548 | A1* | 1/2019 | Karay | F01N 13/002 |

FOREIGN PATENT DOCUMENTS

| | | |
|---|---|---|
| JP | 2010043576 A | 2/2010 |
| WO | WO-2011114823 A1 | 9/2011 |
| WO | WO-2016179119 A1 | 11/2016 |

* cited by examiner

MUFFLER FOR SMALL ENGINES

CROSS-REFERENCE TO RELATED APPLICATIONS

This application is a 371 U.S. National Stage of International Application No. PCT/AU2020/050694, filed on Jul. 2, 2020, which claims priority to Australian Application No. 2019902359, filed on Jul. 3, 2019. The entire disclosures of the above applications are incorporated herein by reference.

TECHNICAL FIELD

This invention relates to a muffler for an internal combustion engine to reduce engine noise emissions.

The invention relates more particularly to a compact muffler intended for use with small internal combustion engines, particularly reciprocating piston engines.

The invention has been devised particularly, although not necessarily solely, for use with small, reciprocating piston two-stroke engines of the type used on unmanned aerial vehicles (UAVs), although it can of course also be used in relation to other vehicle types and also on other internal combustion engines as appropriate.

BACKGROUND ART

The following discussion of the background art is intended to facilitate an understanding of the present invention only. The discussion is not an acknowledgement or admission that any of the material referred to is or was part of the common general knowledge as at the priority date of the application.

The discussion is provided in the context of a UAV, although the invention may have application to other vehicle types, including for example snowmobiles and watercraft.

There is often a requirement for a muffler intended for use with internal combustion engines of vehicles such as UAVs, to be of compact and relatively lightweight construction. This can be particularly so for an engine of a UAV, where there are likely to be space constraints within the UAV fuselage and overall weight constraints for the engine and the UAV itself.

Further, it may be desirable for the muffler to be exposed to airflow generated through movement of the UAV while in flight, whereby the airflow can be used to assist with cooling of the muffler. Exposing a muffler to airflow may not, however, be conducive to an aerodynamically efficient configuration. This may be negated (at least somewhat) by mounting the muffler within the confines of the UAV fuselage whilst still having a surface of the muffler exposed to airflow during motion of the UAV. Such a mounting arrangement can, however, be challenging to implement, particularly in circumstances where it is desirable to mount the muffler in a manner which accommodates a certain degree of movement arising from thermal expansion and contraction, but which additionally provides some constraint against excessive vibration.

It is against this background that the present invention has been developed.

SUMMARY OF INVENTION

According to a first aspect of the invention there is provided a muffler comprising a body having an interior chamber, a first end section, and a second end section, the first end section being adapted for mounting onto an engine with the interior chamber in communication with an exhaust outlet of the engine to receive exhaust flow therefrom, and the second end section being adapted to be mounted in a manner resisting movement with respect to the engine.

This arrangement provides for a connection between the muffler and the exhaust outlet of the engine, whereby exhaust flow from the exhaust outlet is delivered to the interior chamber within the muffler body. The feature of the second end section being mounted to resist movement with respect to the engine serves to prevent or at least inhibit any tendency for the connection between the muffler and the exhaust outlet of the engine to open under the influence of thermal expansion or contraction.

In one arrangement, the feature of the second end section being mounted to resist movement with respect to the engine may comprise a yielding resistance. The yielding resistance may be provided by a resilient coupling. The resilient coupling may comprise one or more springs operably connected to the second end section. The spring(s) may comprise one or more leaf springs.

In another arrangement, the feature of the second end section being mounted to resist movement with respect to the engine may comprise a coupling configured to exert a force on the muffler body at the second end section in a direction to resist any tendency for the connection between the muffler and the exhaust outlet of the engine to open under the influence of thermal expansion or contraction. The force may comprise preload applied through the coupling.

In being adapted to be mounted in a manner resisting movement with respect to the engine, the second end section may be adapted for mounting onto the engine or onto a structure adjacent the engine. In the case of the second end section being mounted onto the engine, the second end section may, for example, be mounted onto the engine crankcase. The muffler may further comprise a first mount for mounting the first end section onto the engine.

The first mount may be configured as an exhaust pipe section providing an interface between the exhaust outlet of the engine and an inlet opening associated with the first end section of the body of the muffler.

The exhaust pipe section may have a first mounting flange at one end for attachment to the exhaust outlet of the engine and a second mounting flange at another end for attachment to the first end section of the body of the muffler.

The exhaust pipe section may further comprise strengthening means between the first and second mounting flanges. The strengthening means may be configured as a strengthening element extending between the first and second mounting flanges. The strengthening element may, for example, comprise a rib, strut or brace.

The muffler may further comprise a second mount for mounting the second end section onto the engine or a structure adjacent the engine.

In one arrangement, the second mount may provide the resilient coupling operable to yieldingly resist movement with respect to the engine.

In another arrangement, the second mount may provide the coupling configured to exert said force on the body of the muffler.

The muffler body may be elongate; that is, it may have a longitudinal extent between the first and second end sections.

The muffler may present an outer surface. More particularly, the muffler body may present an outer surface.

The outer surface may be arcuate in its longitudinal direction.

According to a second aspect of the invention there is provided a muffler comprising a body having an interior chamber, and first and second end sections, a first mount for mounting the first end section onto an engine with the interior chamber in communication with an exhaust outlet of the engine to receive exhaust flow therefrom, and a second mount for mounting the second end section in a manner resisting movement with respect to the engine.

According to a third aspect of the invention there is provided a muffler comprising a body having an interior chamber and first and second end sections, a first mount for mounting the first end section onto an engine with the interior chamber in communication with an exhaust outlet of the engine to receive exhaust flow therefrom, and a second mount for mounting the second end section to yieldingly resist movement with respect to the engine.

The muffler according to the third aspect of the invention may, as appropriate, have any one or more of the features specified above in relation to the first and second aspects of the invention.

According to a fourth aspect of the invention there is provided a muffler comprising a body having an interior chamber and first and second end sections, a first mount for mounting the first end section onto an engine with the interior chamber in communication with an exhaust outlet of the engine to receive exhaust flow therefrom, and a second mount for mounting the second end section under a preload resisting movement of the second end section with respect to the engine.

The muffler according to the fourth aspect of the invention may, as appropriate, have any one or more of the features specified above in relation to the first and second aspects of the invention.

According to a fifth aspect of the invention there is provided an internal combustion engine fitted with a muffler according to any one of the aspects of the invention.

According to a sixth aspect of the invention there is provided a vehicle comprising an internal combustion engine fitted with a muffler according to any one of the aspects of the invention.

The vehicle according to the sixth aspect of the invention may comprise an exterior surface and the muffler may present an outer surface coincident with or recessed with respect to the exterior surface of the vehicle. With this arrangement, the outer surface of the muffler may be exposed to airflow during motion of the vehicle.

In the case where the outer surface of the muffler is recessed with respect to the exterior surface of the vehicle, means may be provided for redirecting air to flow over the outer surface of the muffler.

The vehicle according to the sixth aspect of the invention may comprise a UAV.

According to a seventh aspect of the invention there is provided a UAV comprising a fuselage presenting an exterior surface, and an internal combustion engine fitted with a muffler, wherein the muffler presents an outer surface coincident with or recessed with respect to the exterior surface of the fuselage, and wherein the muffler is in accordance with any one of the aspects of the invention.

The fuselage may at least in part be generally cylindrical, with the exterior surface at the cylindrical part being curved in cross-section.

The muffler body may be elongate and configured to be arcuate in the longitudinal direction.

Further, the curvature of the arcuate outer surface of the muffler may conform generally to the cross-sectional curvature of the fuselage.

With this arrangement, the muffler may be disposed crosswise within the fuselage, with the curved outer surface of the muffler being coincident with or recessed with respect to the curved exterior surface of the fuselage.

In the case where the curved outer surface of the muffler is recessed with respect to the exterior surface of the fuselage, means may be provided for redirecting air to flow over the curved outer surface of the muffler. In one arrangement, such means may comprise a cover fitted to the fuselage over the recessed muffler and adapted to cooperate with an adjacent section of the fuselage to redirect air to flow over the curved outer surface of the muffler.

According to a further aspect of the invention there is provided a muffler comprising a body having an interior chamber, a first end section, a second end section and an outlet opening through which the exhaust discharges from the muffler, the outlet opening located between the first end section and the second end section, the first end section being adapted for mounting onto an engine with the interior chamber in communication with an exhaust outlet of the engine to receive exhaust flow therefrom, and the second end section being adapted to be mounted in a manner resisting movement with respect to the engine.

According to a further aspect of the invention there is provided a muffler adapted to be fitted to a single cylinder engine, the muffler comprising a body having an interior chamber, a first end section, and a second end section, the first end section being adapted for mounting onto the engine with the interior chamber in communication with an exhaust outlet of the single cylinder to receive exhaust flow therefrom, and the second end section being adapted to be mounted in a manner resisting movement with respect to the engine.

According to a further aspect of the invention there is provided a muffler comprising a body having an interior chamber, a first end section, a second end section, and an outlet opening through which the exhaust discharges from the muffler, the outlet opening located between the first end section and the second end section, a first mount for mounting the first end section onto an engine with the interior chamber in communication with an exhaust outlet of the engine to receive exhaust flow therefrom, and a second mount for mounting the second end section in a manner resisting movement with respect to the engine.

According to a further aspect of the invention there is provided a muffler adapted to be fitted to a single cylinder engine, the muffler comprising a body having an interior chamber, a first end section, a second end section, a first mount for mounting the first end section onto the engine with the interior chamber in communication with an exhaust outlet of the engine to receive exhaust flow from the single cylinder, and a second mount for mounting the second end section in a manner resisting movement with respect to the engine.

According to a further aspect of the invention there is provided a muffler comprising a body having an interior chamber, a first end section, a second end section, and an outlet opening through which the exhaust discharges from the muffler, the outlet opening located between the first end section and the second end section, a first mount for mounting the first end section onto an engine with the interior chamber in communication with an exhaust outlet of the engine to receive exhaust flow therefrom, and a second mount for mounting the second end section to yieldingly resist movement with respect to the engine.

According to a further aspect of the invention there is provided a muffler adapted to be fitted to a single cylinder engine, the muffler comprising a body having an interior chamber, a first section and a second end section, a first mount for mounting the first end section onto an engine with the interior chamber in communication with an exhaust outlet of the single cylinder to receive exhaust flow therefrom, and a second mount for mounting the second end section to yieldingly resist movement with respect to the engine.

According to a further aspect of the invention there is provided a muffler comprising a body having an interior, a first end section, a second end section, and an outlet opening through which the exhaust discharges from the muffler, the outlet opening located between the first end section and the second end section, a first mount for mounting the first end section onto an engine with the interior chamber in communication with an exhaust outlet of the engine to receive exhaust flow therefrom, and a second mount for mounting the second end section under a preload resisting movement of the second end section with respect to the engine.

According to a further aspect of the invention there is provided a muffler adapted to be fitted to a single cylinder engine, the muffler comprising a body having an interior chamber and first and second end sections, a first mount for mounting the first end section onto the single cylinder of the engine with the interior chamber in communication with an exhaust outlet of the cylinder to receive exhaust flow therefrom, and a second mount for mounting the second end section under a preload resisting movement of the second end section with respect to the engine.

According to a further aspect of the invention there is provided a muffler comprising a body having an interior chamber, a first end section, and a second end section, the first end section being adapted for mounting onto an engine with the interior chamber in communication with an exhaust outlet of the engine to receive exhaust flow therefrom, wherein the second end section is mounted with respect to the engine by way of a yielding resistance, thereby resisting movement with respect to the engine.

According to a further aspect of the invention there is provided a muffler adapted to be fitted to a single cylinder engine, the muffler comprising:
  a body having an interior chamber,
  a first end section,
  a second end section, and
  an outlet opening through which the exhaust discharges from the muffler, the outlet opening located between the first end section and the second end section,
  the first end section being adapted for mounting onto the engine with the interior chamber in communication with an exhaust outlet of the single cylinder engine to receive exhaust flow therefrom, and
  a resilient coupling which mounts the second end section with respect to the engine,
    wherein the resilient coupling provides a yielding resistance, such that the resilient coupling resists movement between the engine and the second end section when mounted thereto,
    the resilient coupling being in the form of one or more spring means wherein the one or more spring means extend between the second end section, or adjacent thereto, and the engine,
    the resilient coupling biasing the first end section into mating engagement with the engine.

According to a further aspect of the invention there is provided a muffler comprising a body having an interior chamber, a first end section, and a second end section, the first end section being adapted for mounting onto an engine with the interior chamber in communication with an exhaust outlet of the engine to receive exhaust flow therefrom, and the second end section being adapted to be mounted in a manner resisting movement with respect to the engine, the mounting being in the form of a resilient coupling which mounts the second end section with respect to the engine, wherein the resilient coupling provides a yielding resistance.

According to a further aspect of the invention there is provided a muffler comprising a body having an interior chamber, a first end section, a second end section and an outlet opening through which the exhaust discharges from the muffler, the outlet opening located between the first end section and the second end section, the first end section being adapted for mounting onto an engine with the interior chamber in communication with an exhaust outlet of the engine to receive exhaust flow therefrom, and the second end section being adapted to be mounted in a manner resisting movement with respect to the engine, the mounting being in the form of a resilient coupling which mounts the second end section with respect to the engine, wherein the resilient coupling provides a yielding resistance.

According to a further aspect of the invention there is provided a muffler adapted to be fitted to a single cylinder engine, the muffler comprising a body having an interior chamber, a first end section, and a second end section, the first end section being adapted for mounting onto the engine with the interior chamber in communication with an exhaust outlet of the single cylinder engine to receive exhaust flow therefrom, wherein a resilient coupling mounts the second end section with respect to the engine, the resilient coupling providing a yielding resistance, such that the resilient coupling resists movement between the engine and the second end section when mounted thereto, the resilient coupling biasing the first end section into mating engagement with the engine.

According to a further aspect of the invention there is provided a muffler comprising a body having an interior chamber, and first and second end sections, a first mount for mounting the first end section onto an engine with the interior chamber in communication with an exhaust outlet of the engine to receive exhaust flow therefrom, and a second mount for mounting the second end section in a manner resisting movement with respect to the engine, the mounting being in the form of a resilient coupling which mounts the second end section with respect to the engine, wherein the resilient coupling provides a yielding resistance.

According to a further aspect of the invention there is provided a muffler comprising a body having an interior chamber and first and second end sections, a first mount for mounting the first end section onto an engine with the interior chamber in communication with an exhaust outlet of the engine to receive exhaust flow therefrom, and a second mount for mounting the second end section to yieldingly resist movement with respect to the engine, the mounting being in the form of a resilient coupling which mounts the second end section with respect to the engine, wherein the resilient coupling provides a yielding resistance.

According to a further aspect of the invention there is provided a muffler comprising a body having an interior chamber and first and second end sections, a first mount for mounting the first end section onto an engine with the interior chamber in communication with an exhaust outlet of the engine to receive exhaust flow therefrom, and a second mount for mounting the second end section under a preload resisting movement of the second end section with respect to the engine, the second mounting biasing the first end section into mating engagement with the engine at the first mount.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views provided. The drawings shown are not necessarily to scale, with emphasis instead generally being placed upon illustrating the principles of the present invention.

Figure 1:
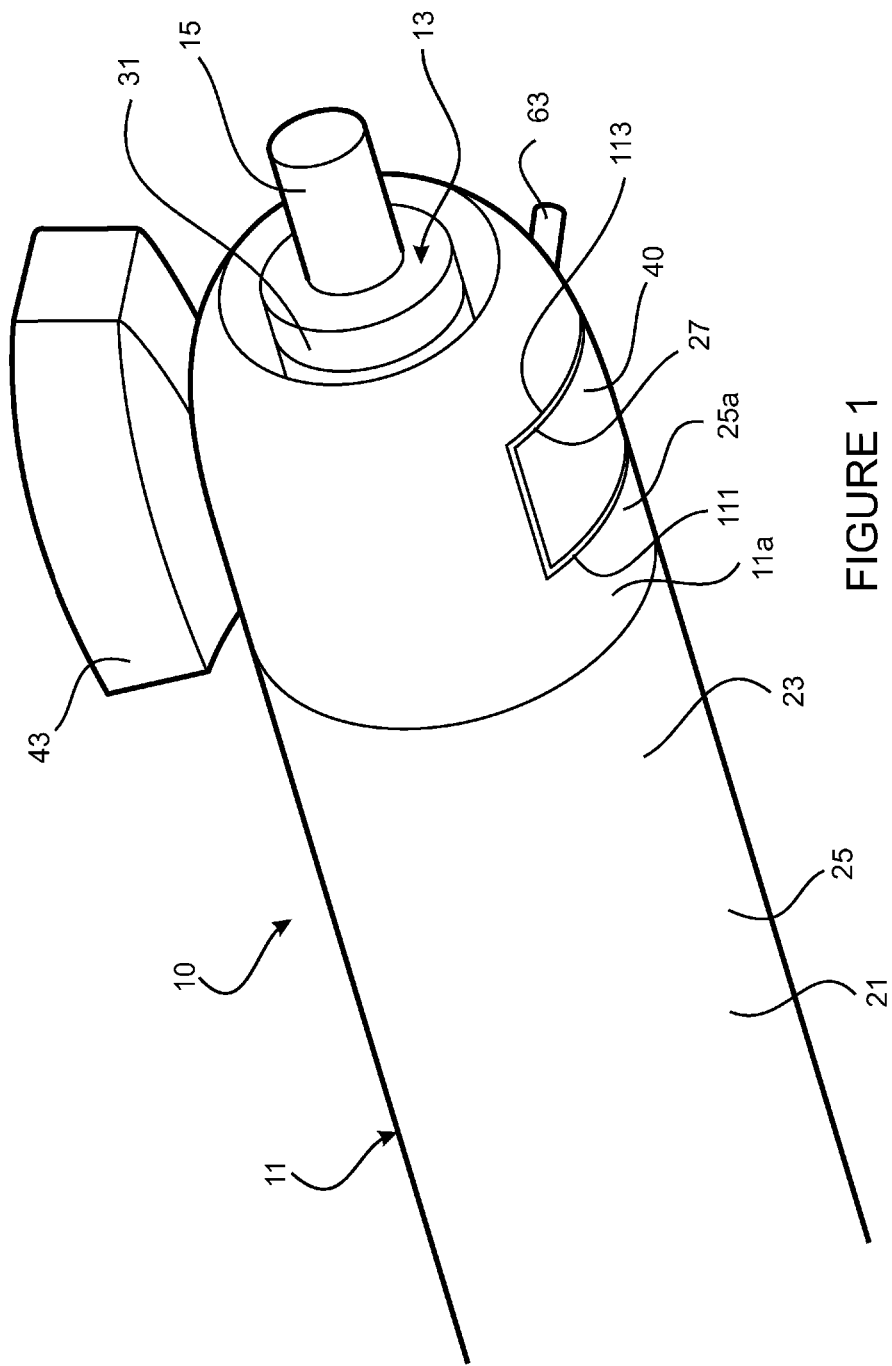
FIG. 1 is a fragmentary perspective view of a first embodiment featuring a UAV, illustrating a rear end section of the fuselage.
Figure 2:
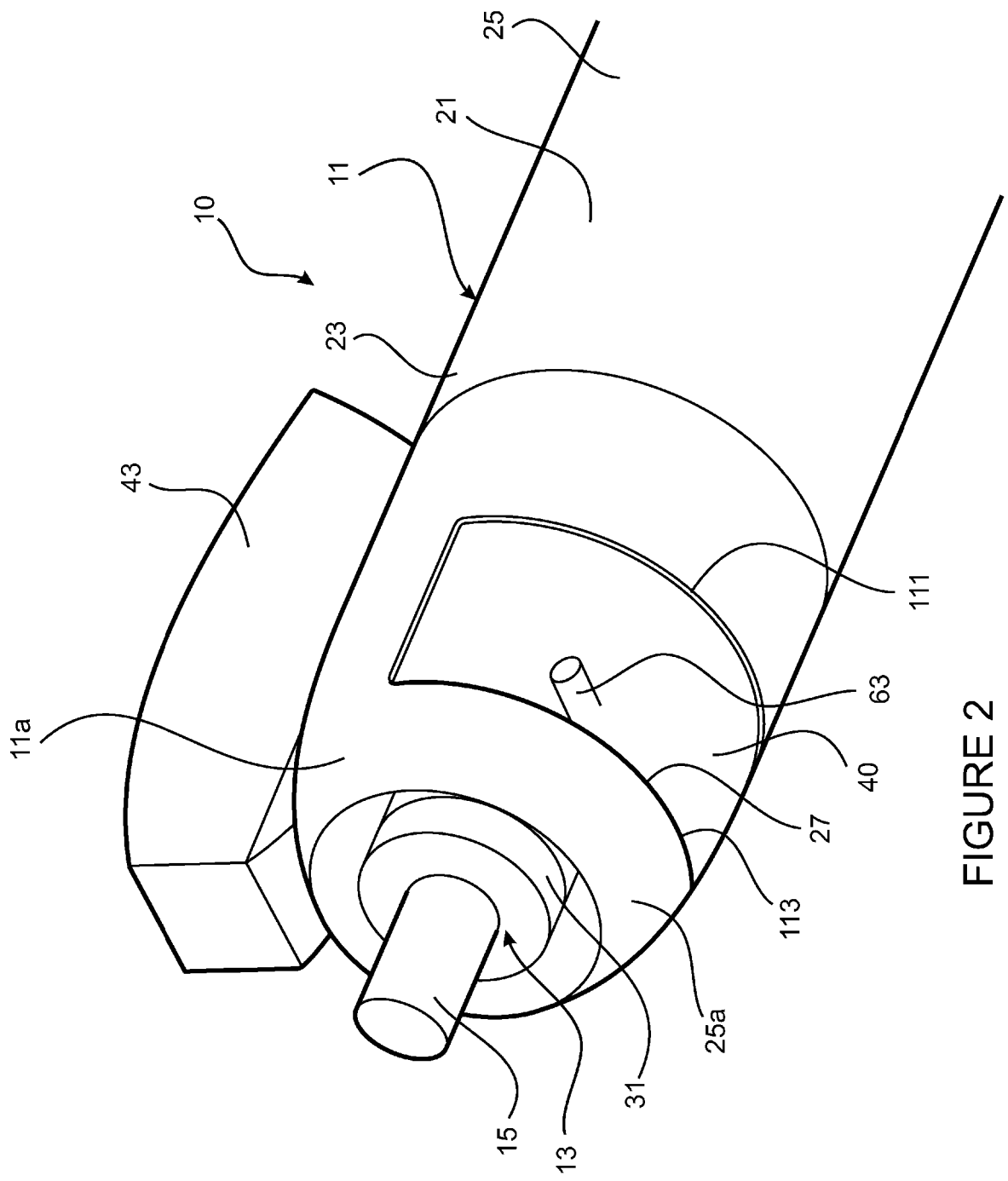
FIG. 2 is a view similar to FIG. 1 but from the other side.
Figure 3:
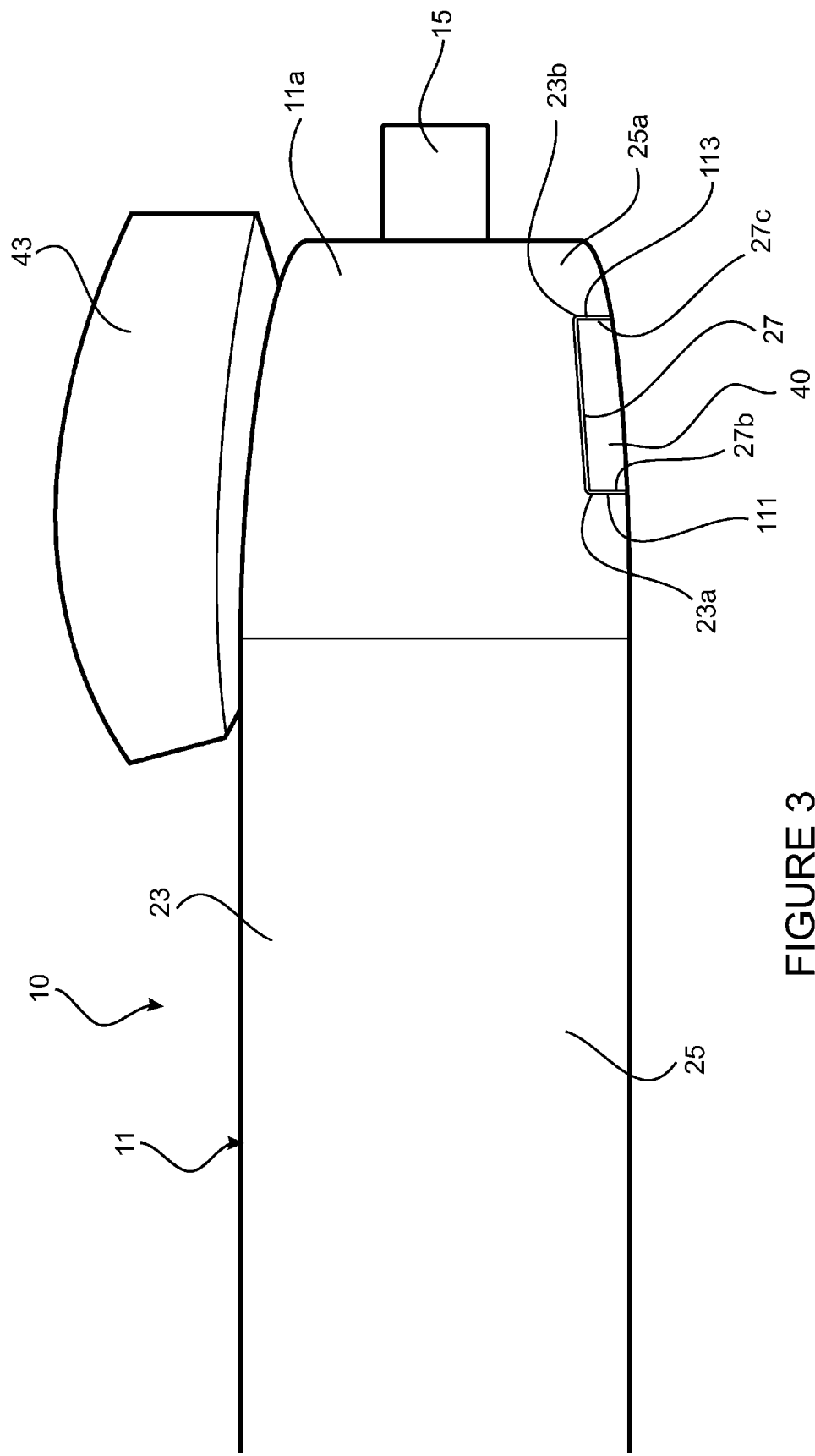
FIG. 3 is a fragmentary view of the UAV from one side thereof, illustrating the rear end section of the fuselage.
Figure 4:
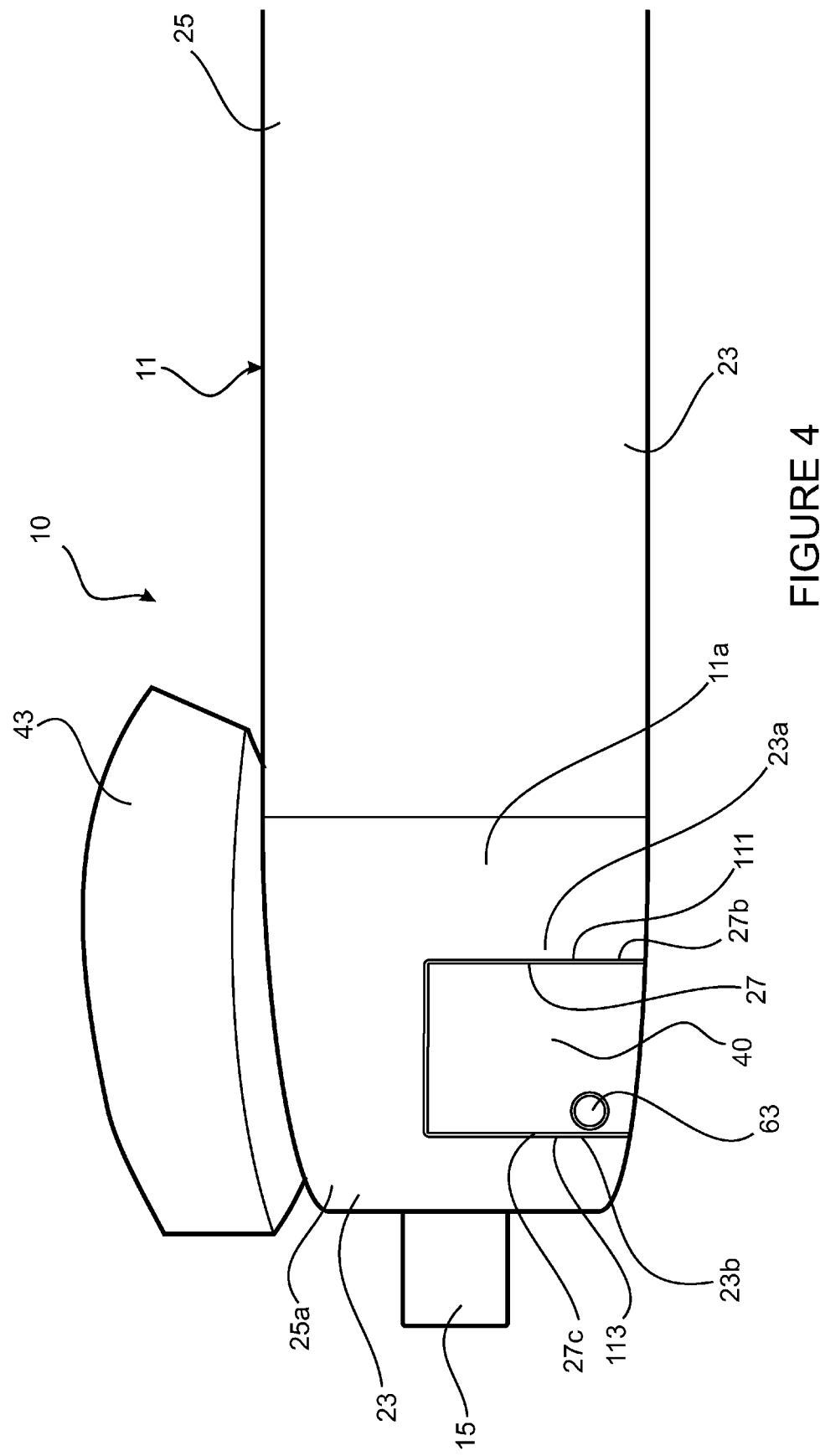
FIG. 4 is a view similar to FIG. 3 but from the other side.
Figure 5:
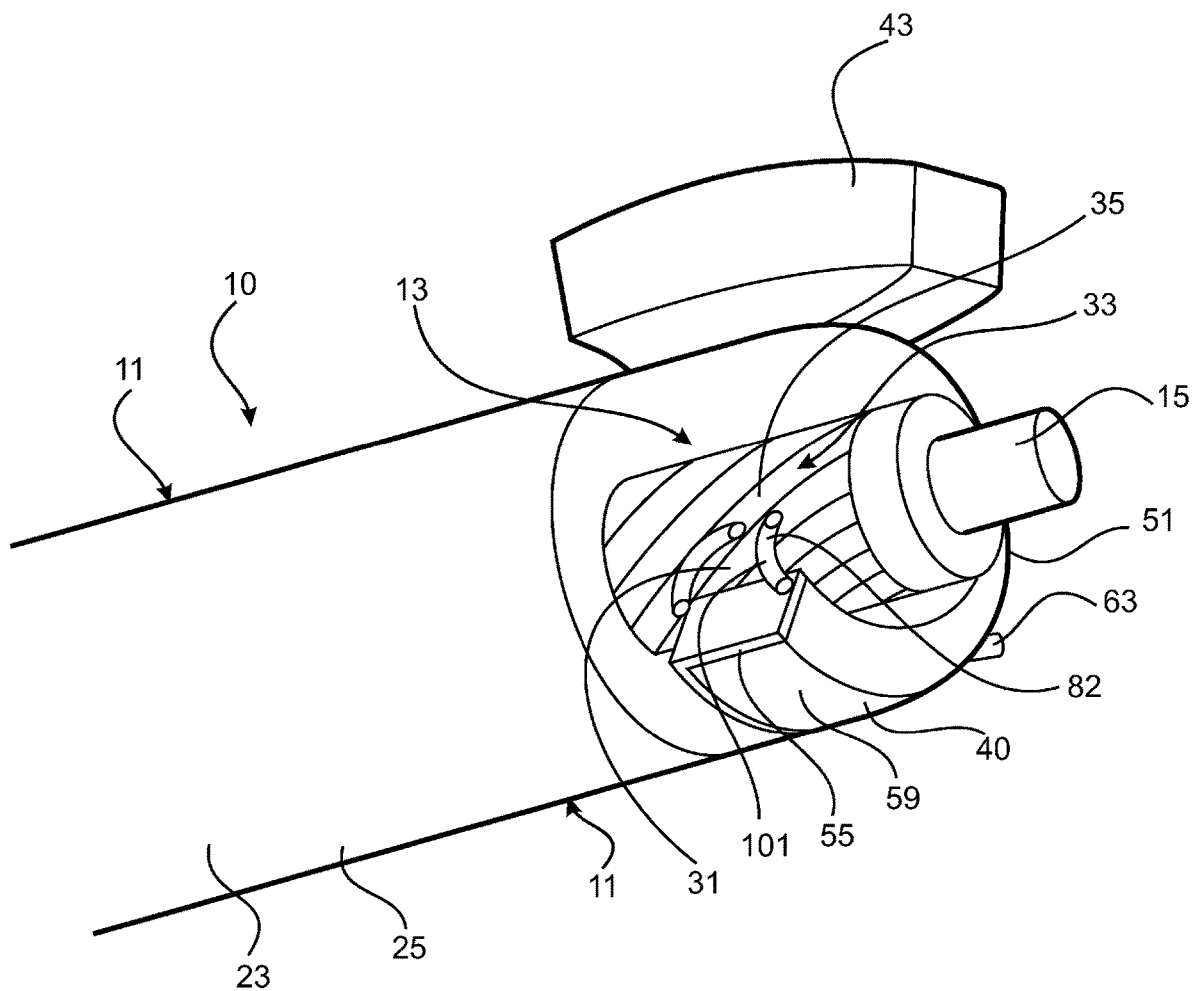
FIG. 5 is a view similar to FIG. 1, but with skin sections and parts removed to reveal an engine system of the UAV.
Figure 6:
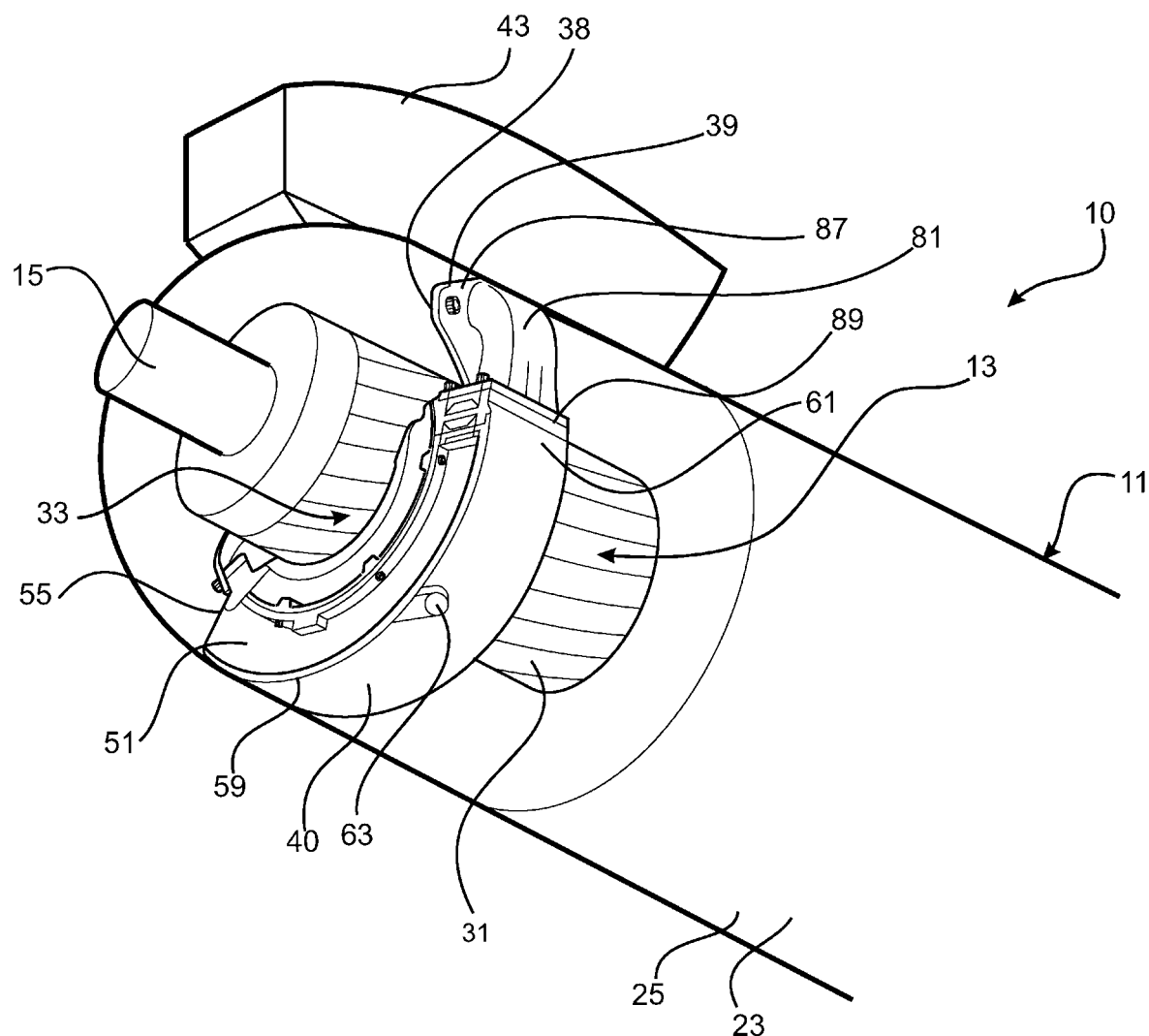
FIG. 6 is a view similar to FIG. 2, but with skin sections and parts removed to reveal the engine system of the UAV.
Figure 7:
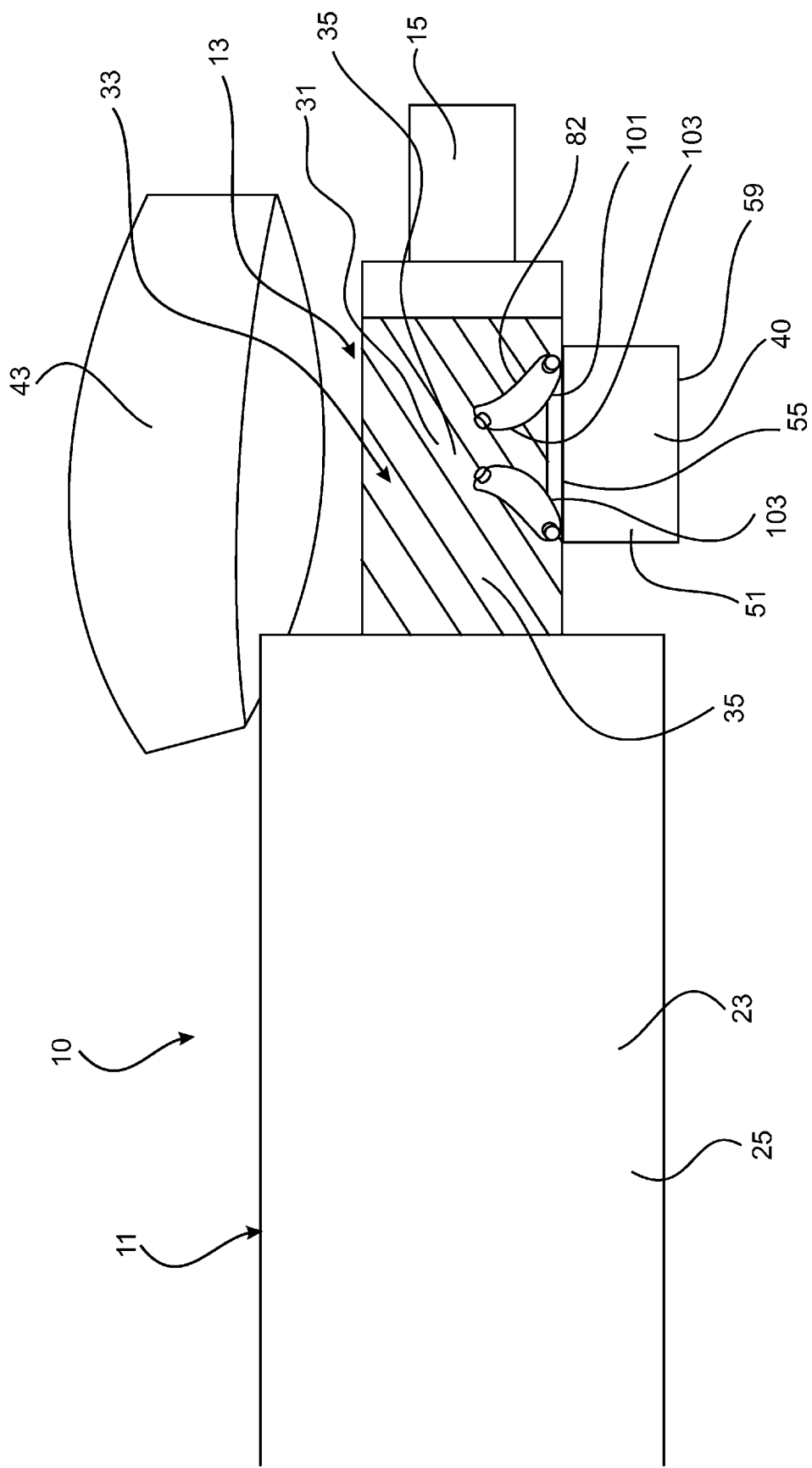
FIG. 7 is a view similar to FIG. 3, but with skin sections and parts removed to reveal the engine system of the UAV.
Figure 8:
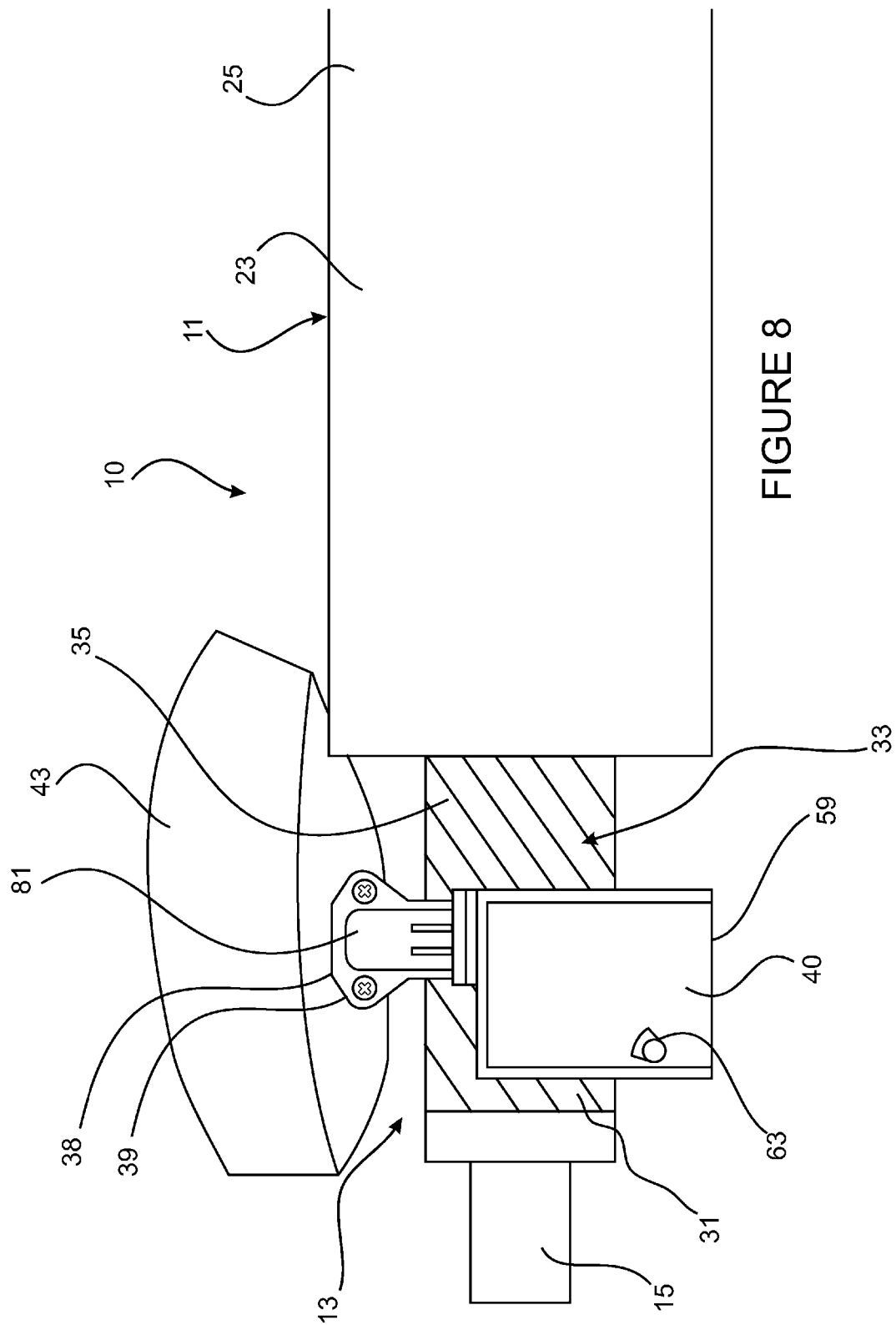
FIG. 8 is a view similar to FIG. 4, but with skin sections and parts removed to reveal the engine system of the UAV.
Figure 9:
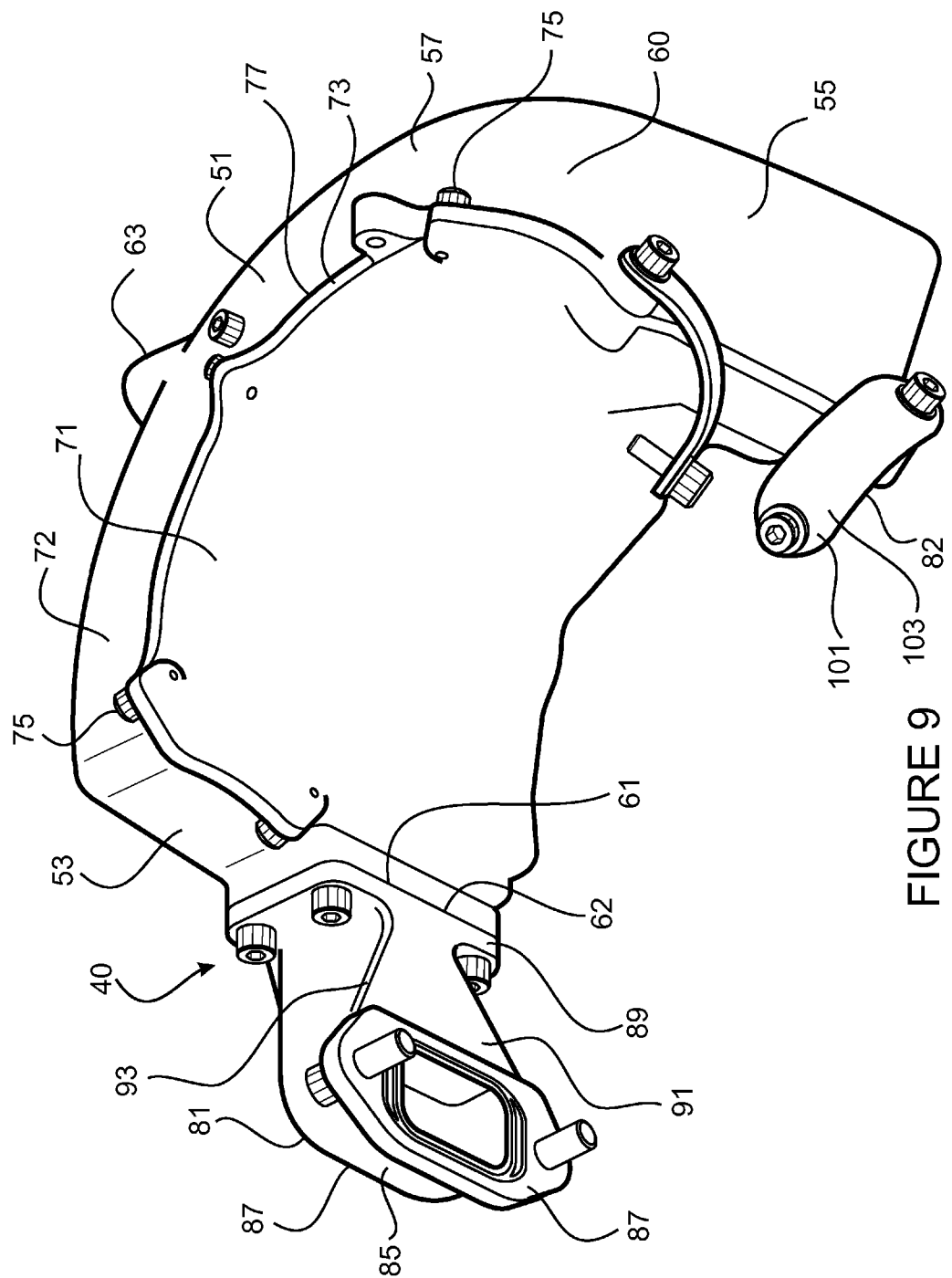
FIG. 9 is a perspective view of a muffler for the engine system of the UAV.

The figures depict several embodiments of the invention. The embodiments illustrate certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

In the following detailed description, the present invention is described in connection with several preferred embodiments. However, to the extent that the following description is specific to a particular embodiment or a particular use of the present techniques, it is intended to be illustrative only and merely provides a concise description of the exemplary embodiment. Accordingly, the present invention is not limited to the specific embodiments described below, but rather the invention includes all alternatives, modifications and equivalents falling within the true scope of the appended claims.

Referring to FIGS. 1 to 11 of the drawings, there is shown a UAV 10 comprising a fuselage 11 and an engine system 13 for driving a propulsion unit (not shown). In this embodiment, the propulsion unit is of a pusher configuration, comprising a rearward facing propeller (not shown). The propeller is adapted to be mounted on a hub 15 to which the engine system 13 is drivingly connected. With this arrangement, the engine system 13 is accommodated within a rear end section 11a of the fuselage 11, forward of the propeller.

The UAV 10 is not shown in its entirety in the drawings, but the general features of the fuselage 11 and engine system 13 referred to above would be well understood by a person skilled in the art.

The fuselage 11 comprises an outer skin 21 defining an exterior surface 23. In the arrangement shown, the outer skin 21 comprises a plurality of skin sections 25 which are selectively removable to provide access to interior parts of the fuselage 11. The skin sections 25 include skin section 25a disposed about the engine system 13 at rear end section 11a of the fuselage 11. In FIGS. 5 to 8, the skin section 25a is removed to reveal the engine system 13. The skin section 25a includes an opening 27, the purpose of which will be explained later.

The rear end section 11a of the fuselage 11 is generally cylindrical and the exterior surface 23 of the rear end section 11a is generally curved in cross-section.

The engine system 13 comprises an engine 31 which in this embodiment is in the form of a small, single-cylinder reciprocating piston two-stroke engine. The engine system 13 further comprises an array 33 of ancillary components for operation of the engine 31, including provision for delivery of a combustible mixture to the engine, and a control system for controlling ignition and operation of the engine more generally.

The engine 31 comprises a crankcase 35 and a cylinder head (not visible) incorporating a combustion chamber, as well as an exhaust outlet 38 from which exhaust is discharged from the combustion chamber. The exhaust outlet 38 is bounded by a mounting face 39 to which a muffler 40 is connected, as will be explained in more detail later.

The crankcase 35 is mounted within the fuselage 11 by way of an engine mounting assembly (not shown). The cylinder head is accommodated within a laterally protruding shroud 43 which also incorporates an engine air intake.

Figure 10:
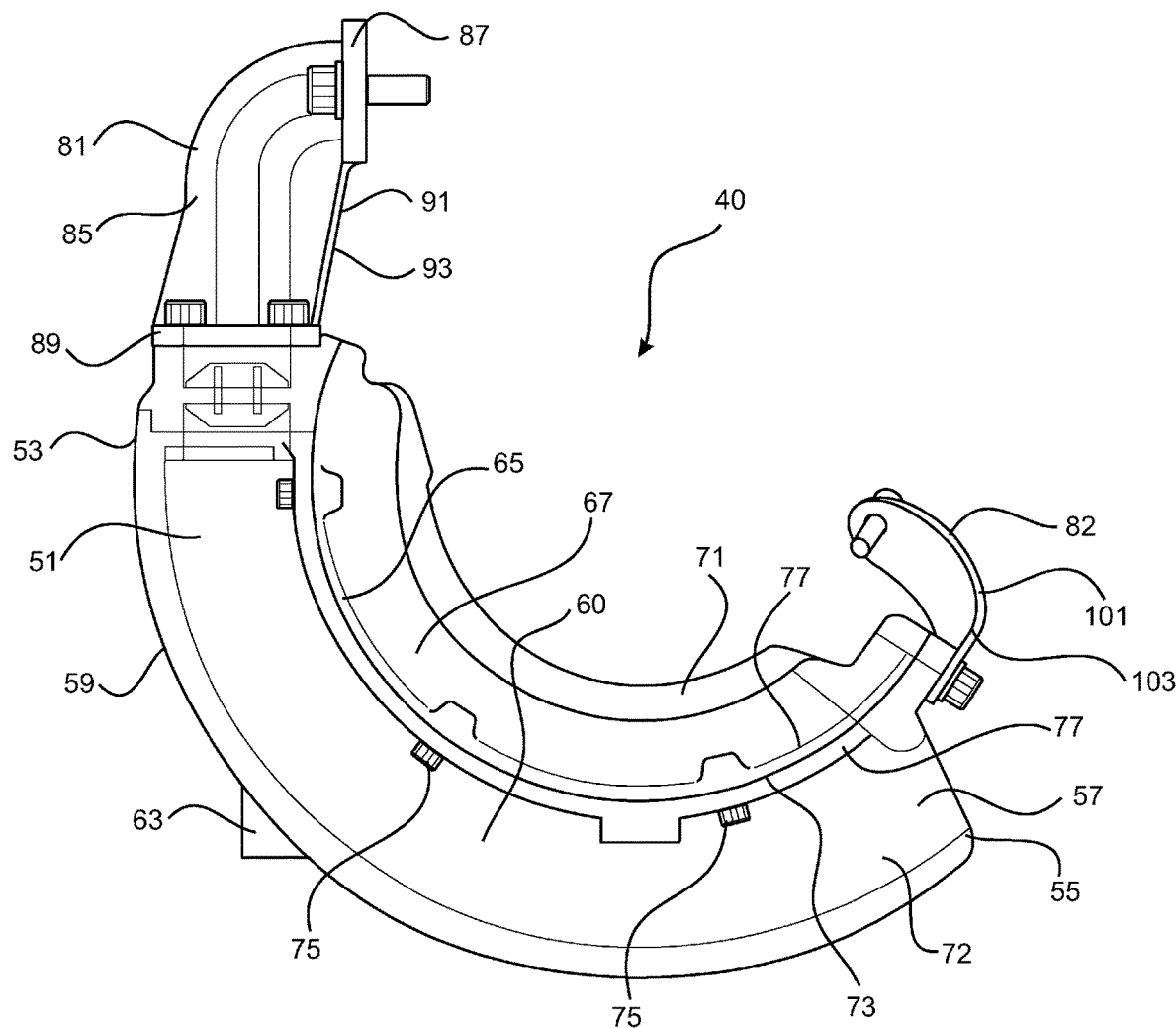
FIG. 10 is a side view of the muffler.
Figure 11:
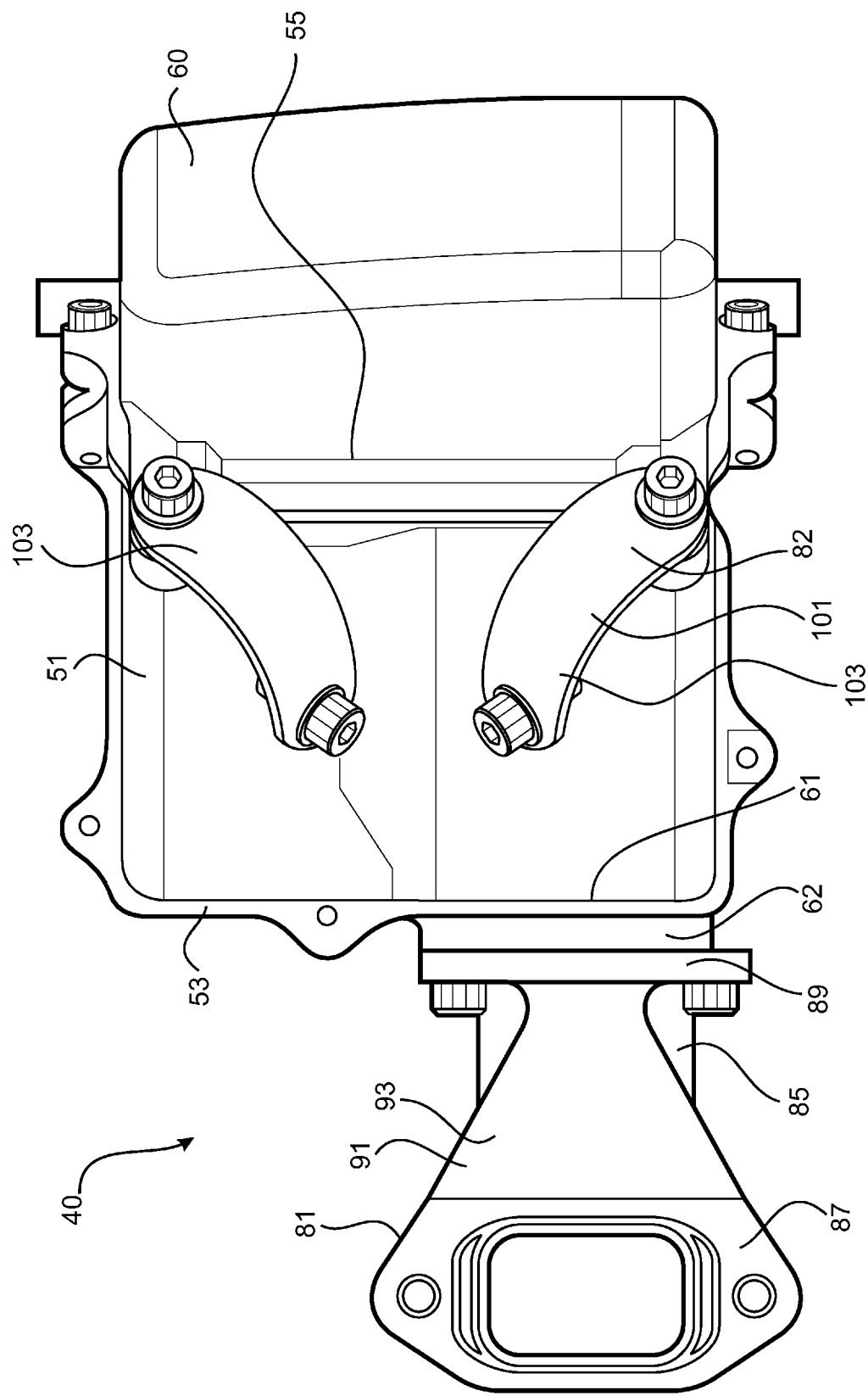
FIG. 11 is a plan view of the muffler.

The muffler 40 comprises a body 51 having a first end section 53 and a second end section 55. The body 51 is elongate, having a longitudinal extent between the first and second end sections 53, 55. The body 51 is configured as a casing 57 defining an interior chamber 60. The body 51 is arcuate along its longitudinal extent between the two end sections 53, 55, as best seen in FIG. 10. With this arrangement, the casing 57 presents an outer surface 59 which is curved. The curvature of the outer surface 59 conforms generally to the cross-sectional curvature of the exterior surface 23 of the rear end section 11a.

The muffler body 51 has an inlet opening 61 at the first end section 53 and an outlet opening 63 in the outer surface 59. The inlet opening 61 is bounded by a mounting face 62. The inlet opening 61 is adapted for communication with the exhaust outlet 38 of the engine 31 to deliver the exhaust into the interior chamber 60 of the muffler 40. A series of flow passages 65 are provided in the interior chamber 60, providing a long gas flow path 67 (facilitated by the elongate profile of the muffler 40) with multiple directional changes towards the outlet opening 63 at which the exhaust discharges to atmosphere. In this embodiment, the gas flow path 67 constitutes a single flow path extending between the inlet opening 61 and the outlet opening 63. A constriction such as a ramp (not shown) may be incorporated in the flow path 67 approaching the outlet opening 63, providing a restriction followed by an expansion zone at the outlet opening 63. With this arrangement, the muffler 40 provides broad noise attenuation with low flow restriction and high blockage resistance.

In this embodiment, the muffler body 51 is of two-part construction, comprising first and second parts 71, 72 adapted to mate at parting line 73 and to be releasably fastened together by fasteners 75. The first and second parts 71, 72 have joining flanges 77 which abut at the parting line 73 and which are connected together by the fasteners 75. Each part 71, 72 defines a portion of the casing 57 and respective portions of various internal walls which define the flow passages 65 within the interior chamber 60. The two parts 71, 72 are disposed in a radially inner and outer relationship, whereby the first part 71 constitutes an inner part and the second part 72 constitutes a corresponding outer part which defines the outer surface 59. Other arrangements are of course possible. For instance, the muffler body 51 may comprise two parts disposed in a side-by-side relationship, rather than in a radially inner and outer relationship. In another arrangement, the muffler body 51 may be of one-piece construction; for example, manufactured by a 3D printing process.

The muffler 40 further comprises a first mount 81 for mounting the first end section 53 onto the engine 31 with the interior chamber 60 in communication with the exhaust outlet 38 of the engine to receive exhaust flow therefrom, and a second mount 82 for mounting the second end section 55 in a manner resisting movement with respect to the engine 31. This arrangement provides for a connection between the muffler 40 and the exhaust outlet 38 of the engine 31, whereby exhaust flow from the exhaust outlet 38 is delivered into the interior chamber 60 within the muffler body 51. The feature of the second end section 55 being mounted to resist movement with respect to the engine 31 serves to prevent or at least inhibit any tendency for the connection between the muffler 40 and the exhaust outlet 38 of the engine 31 to open under the influence of thermal expansion or contraction, as will be explained in more detail later.

The first mount 81 is configured as an exhaust pipe section 85 providing an interface 87 between the exhaust outlet 38 of the engine 31 and the inlet opening 61 at the first end section 53 of the muffler body 51. The exhaust pipe section 85 has a first mounting flange 87 at one end for attachment to the mounting face 39 of the exhaust outlet 38 of the engine 31, and a second mounting flange 89 at another end for attachment to the mounting face 62 at the first end section 53 of the muffler 51. The mounting flanges 87, 89 may be adapted to be attached to the respective mounting faces 39, 62 in any appropriate manner, such as by way of bolted connections.

The exhaust pipe section 85 further comprises a strengthening means 91 between the first and second mounting flanges 87, 89. The strengthening means 91 is configured as a strengthening element 93 extending between the first and second mounting flanges 87, 89. In the arrangement shown, the strengthening element 93 is in the form of a web. The exhaust pipe section 85 is configured to provide minimal frontal area and so minimise drag during motion of the UAV 10.

In this embodiment, the second mount 82 is configured as a resilient coupling 101 configured to yieldingly resist movement of the second end section 55 of the muffler body 51 with respect to the engine 31. In the arrangement shown, the resilient coupling 101 comprises two springs 103 operably connected between the second end section 55 and the crankcase 35 of the engine 31. The springs 103 are in the form of leaf springs, one end of each of which is connected to the muffler casing 57 and the other end of each of which is connected to the engine crankcase 35. The leaf springs 103 may be in the form of quarter circular leaf springs.

The resilient coupling 101 is operable to yieldingly resist movement of the muffler body 51 arising from thermal expansion and contraction and to also damp vibration of the muffler 40. The damping seeks to limit vibration and thereby maintain resonance outside of the first mode of engine frequency during operation. In practice, the two springs 103 are selected to constrain against too much movement of the muffler body 51 and ensure that the resonant frequency of the muffler 40 is outside of the first mode of engine frequency during operation.

The resilient coupling 101 also imparts a biasing force onto the muffler body 51 to prevent or at least inhibit any tendency for the connection between the muffler 40 and the exhaust outlet 38 (provided by the first mounting flange 87 and the mounting face 39) to open under the influence of vibration and thermal expansion or contraction. The resilient coupling 101 in effect biases the first mounting flange 87 and the mounting face 39 into mating engagement with each other.

In the arrangement described and illustrated, the resilient coupling 101 is connected to the engine crankcase 35. Other connection arrangements are of course contemplated, including connecting the resilient coupling 101 to another part of the engine 31 or some other relatively rigid structure or stable base associated with the engine (for example, the engine mounting assembly).

The muffler 40 is configured to be disposed crosswise within the fuselage 11, as best seen in FIGS. 5 to 8, with the outer surface 59 of the muffler 40 exposed to airflow during motion of the UAV 10. The muffler 40 is in a sense disposed in an underslung condition with respect to the engine 31, being mounted in position by way of the first and second mounts 81, 82. In this condition, the outer surface 59 of the muffler 40 is exposed to airflow during motion of the UAV 10.

The muffler 40 may be so positioned that the curved outer surface 59 is either coincident with the curved exterior surface 23 of the rear end section 11a of the fuselage 11 or recessed with respect to the curved exterior surface 23. In either case, the muffler 40 is arranged to not affect the aerodynamics of the fuselage 11 to any significant extent. This is particularly so as the curvature of the outer surface 59 of the muffler 40 conforms generally to the cross-sectional curvature of the exterior surface 23 of the rear end section 11a.

In the arrangement shown, the muffler 40 is so positioned with respect to the opening 27 that the curved outer surface 59 is aligned with respect to the curved exterior surface 23 of the rear end section 11a of the fuselage 11. The curved outer surface 59 of the muffler 40 is positioned within the opening 27 ensuring continuity of the surface 23 of the rear end section 11a of the fuselage 11 (and thereby negating the significance of any adverse aerodynamics or drag that might otherwise arise from the presence of a disruption provided by the orientation of the muffler 40).

This arrangement ensures that some of the air flowing along the exterior surface 23 of the rear end section 11a of the fuselage 11 also provides some airflow over the curved outer surface 59 of the muffler 40. Furthermore, a leading gap 111 is established between the muffler 40 and a leading edge 27b of the opening 27 on an adjacent part 23a of the exterior surface 23. Similarly, a trailing gap 113 is established between the muffler 40 and a trailing edge 27c of the opening 27 on adjacent part 23b of the exterior surface 23. The two gaps 111, 113 create exit zones for air contained or flowing around the engine system 13 and within its adjacent skin section 25, the air typically entering the areas surrounding the engine system 13 through other openings in the exterior surface 23. During operation, this internal region effectively becomes pressurised causing air to flow out via the exit zones created by gaps 111, 113, which helps avoid the formation of low pressure zones at the gaps 111, 113 which may otherwise disrupt flow along the exterior surface 23 of the rear end section 11a of the fuselage 11 and reduce overall aerodynamic efficiency.

The feature whereby the outer surface 59 of the muffler 40 is exposed to airflow during motion of the UAV 10 is additionally advantageous as it can also assist cooling of the muffler 40.

Further, the feature whereby the muffler 40 can accommodate expansion and contraction owing to the yielding mounting arrangement afforded by the resilient coupling 101 is advantageous. In particular, the arrangement permits the engine 31 to operate at higher exhaust gas temperatures, offering improved fuel economy. In contrast, if the mounting arrangement where fixed (as is conventional practice), there may be a need for an enriched fuelling regime to control exhaust gas temperature, thereby diminishing fuel economy.

These two features cooperate to allow the engine to operate at higher exhaust gas temperatures than otherwise might be possible, without compromising the reliability and service life of the engine 31.

In the first embodiment, the muffler 40 is mounted in a manner to prevent or at least inhibit any tendency for the connection between the muffler 40 and the exhaust outlet 38 of the engine 31 to open under the influence of thermal expansion or contraction. This is achieved by way of second mount 82 in the form of the resilient coupling 101.

Figure 12:
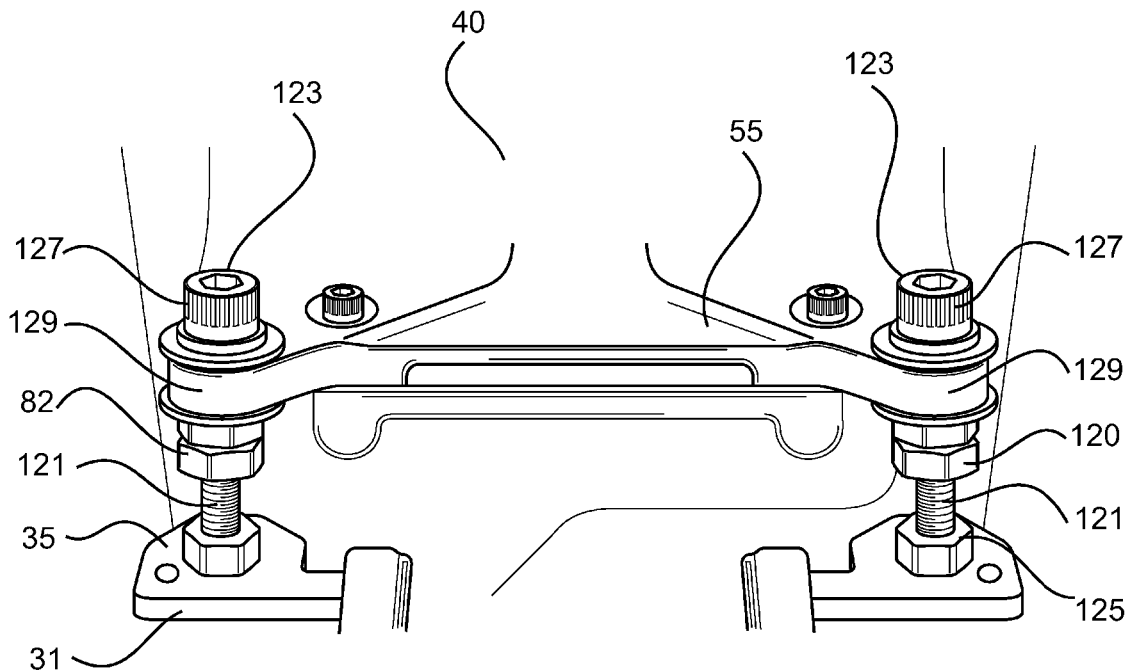
FIG. 12 is a schematic view of a part of a second embodiment featuring a UAV.
Figure 13:
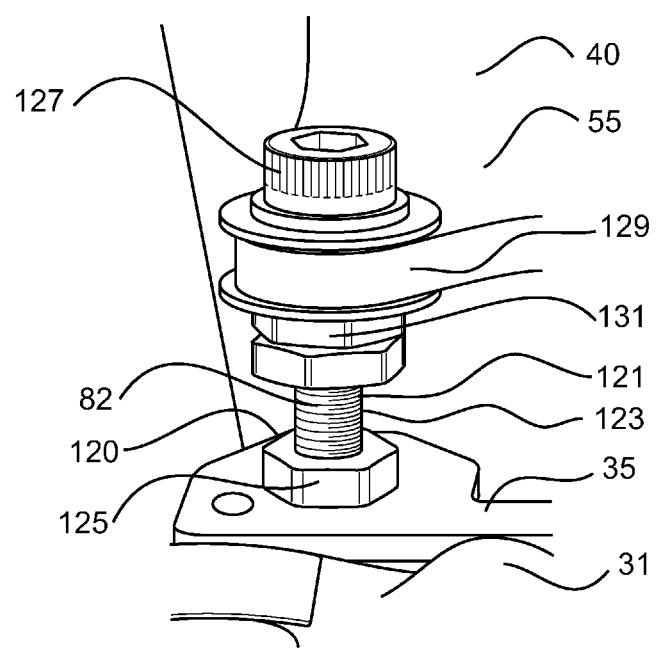
FIG. 13 is a detailed view of part of FIG. 12.

In a second embodiment, which is similar in many respects to the first embodiment, the second mount 82 is configured differently, as will now be described with reference to FIGS. 12 and 13. In the second embodiment, the second mount 82 comprises a coupling 120 configured to exert a force on the muffler body 51 at the second end section 55 in a direction to resist any tendency for the connection between the muffler 40 and the exhaust outlet 38 (provided by the first mounting flange 87 and the mounting face 39) to open under the influence of vibration and thermal expansion or contraction. The force comprises preload applied through the coupling 120.

The coupling 120 comprises two rigid links 121 between the second end section 55 of the muffler body 51 and the engine crankcase 35. The two links 121 are selectively adjustable to urge the second end section 55 of the muffler body 51 towards the engine crankcase 35, thereby creating the requisite preload. In the arrangement shown, each link 121 comprises a fastener 123 having one end in threaded engagement with the crankcase 35 and secured in position by lock nut 125. The fastener 123 is connected at the other end to the second end section 55 of the muffler body 51, with the connection being selectively adjustable to vary the effective length of the fastener 123 and thereby control the extent of preload. Specifically, the fastener 123 has a head 127 which engages a respective lug 129 on the second end section 55 of the muffler body, and a lock nut 131 on the fastener on the opposed side of the lug 129. The fastener 123 can be rotated to impose the requisite preload on the second end section 55 of the muffler body 51 and then locked in place using the lock nut 131.

In the arrangement described and illustrated, the coupling 120 comprises two rigid links 121 between the second end section 55 of the muffler body 51 and the engine crankcase 35. Other connection arrangements are contemplated, including connecting the rigid links 121 to another part of the engine 31 or some other relatively rigid structure or stable base associated with the engine 31.

From the foregoing, it is evident that the present embodiments each provide a simple yet highly effective way of mounting a muffler onto an engine of a UAV in a manner which facilitates cooling of the muffler through exposure to oncoming air flow while the UAV is in flight and which also allows for some thermal expansion and contraction without compromising the connection between the muffler and the engine, thereby allowing the engine to operate at higher exhaust gas temperatures.

The foregoing disclosure is intended to explain how to fashion and use the particular embodiments described, rather than to limit the true, intended, and fair scope and spirit of the present disclosure. The foregoing description is not intended to be exhaustive, nor to be limited to the precise forms disclosed.

It should be appreciated that various modifications can be made without departing from the principles described herein. Therefore, the principles should be understood to include all such modifications within its scope.

Features, integers, characteristics or groups described in conjunction with an aspect, embodiment or example of the invention are to be understood to be applicable to any other aspect, embodiment or example described herein unless incompatible therewith. All the features disclosed in this specification (including any accompanying claims, abstract and drawings) may be combined in any combination, except combinations where at least some of such features are mutually exclusive. The invention is not restricted to the details of any foregoing embodiments. The invention extends to any novel one, or any novel combination, of the features disclosed in this specification (including any accompanying claims, abstract and drawings).

The method steps, processes, and operations described herein are not to be construed as necessarily requiring their performance in the particular order discussed or illustrated, unless specifically identified as an order of performance. It is also to be understood that additional or alternative steps may be employed.

The terminology used herein is for the purpose of describing particular example embodiments only and is not intended to be limiting.

As used herein, the singular forms "a", "an" and "the" may be intended to include the plural forms as well, unless the context clearly indicates otherwise.

Reference to any positional descriptions, such as "top", "bottom" and "side", are to be taken in context of the embodiments described and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

The invention claimed is:

1. A muffler adapted to be fitted to a single cylinder engine, the muffler comprising:
a body having an interior chamber,
a first end section,
a second end section, and
an outlet opening through which the exhaust discharges from the muffler, the outlet opening located between the first end section and the second end section,
the first end section being adapted for mounting onto the engine with the interior chamber in communication with an exhaust outlet of the single cylinder engine to receive exhaust flow therefrom, and
a resilient coupling which mounts the second end section with respect to the engine,
wherein the resilient coupling provides a yielding resistance, such that the resilient coupling resists movement between the engine and the second end section when mounted thereto,
the resilient coupling being in the form of one or more spring means wherein the one or more spring means extend between the second end section, or adjacent thereto, and the engine, and
the resilient coupling biasing the first end section into mating engagement with the engine.

2. A muffler comprising a body having an interior chamber, a first end section, and a second end section, an outlet opening through which exhaust discharges from the muffler, the outlet opening being located between the first end section and the second end section, the first end section being adapted for mounting onto an engine with the interior chamber in communication with an exhaust outlet of the engine to receive exhaust flow therefrom, and the second end section being adapted to be mounted in a manner resisting movement with respect to the engine, the mounting being in the form of a resilient coupling which mounts the second end section with respect to the engine, wherein the resilient coupling provides a yielding resistance.

3. The muffler according to claim 2 wherein the resilient coupling comprises one or more springs operably connected to the second end section.

4. The muffler according to claim 3 wherein the force comprises a preload applied through the resilient coupling.

5. The muffler according to claim 2 wherein the resilient coupling exerts a force on the muffler body at the second end section in a direction to resist any tendency for the connection at the first end section between the muffler and the exhaust outlet of the engine to open under the influence of thermal expansion or contraction.

6. The muffler according to claim 2 wherein the second end section is adapted for mounting onto the engine or onto a structure adjacent the engine.

7. The muffler according to claim 6 further comprising a first mount for mounting the first end section onto the engine wherein the first mount is configured as an exhaust pipe section providing an interface between the exhaust outlet of the engine and an inlet opening associated with the first end section of the body of the muffler.

8. The muffler according to claim 7 wherein the exhaust pipe section comprises a first mounting flange at one end for attachment to the exhaust outlet of the engine and a second mounting flange at another end for attachment to the first end section of the body of the muffler.

9. The muffler according to claim 6 wherein the exhaust pipe section further comprises strengthening means between the first and second mounting flanges wherein the strengthening means comprises a strengthening element extending between the first and second mounting flanges.

10. The muffler according to claim 2 further comprising a first mount for mounting the first end section onto the engine wherein the first mount is configured as an exhaust pipe section providing an interface between the exhaust outlet of the engine and an inlet opening associated with the first end section of the body of the muffler and a second mount for mounting the second end section onto the engine or a structure adjacent the engine.

11. The muffler according to claim 2 wherein the second mount provides the resilient coupling operable to yieldingly resist movement with respect to the engine.

12. The muffler according to claim 2 wherein the muffler body is elongate having a longitudinal extent between the first and second end sections.

13. The muffler according to claim 2 wherein the muffler body presents an outer surface, wherein outer surface is arcuate in a longitudinal direction.

14. A vehicle comprising an internal combustion engine fitted with a muffler according to claim 2.

15. The vehicle according to claim 14 further comprising an exterior surface, wherein the muffler presents an outer surface coincident with or recessed with respect to the exterior surface of the vehicle whereby during motion of the vehicle the outer surface of the muffler is exposed to airflow.

16. The vehicle according to claim 14 wherein the vehicle is in the form of an unmanned aerial vehicle (UAV), the UAV comprising a fuselage presenting an exterior surface, and an internal combustion engine fitted with the muffler, wherein the muffler presents an outer surface coincident with or recessed with respect to the exterior surface of the fuselage.

17. The UAV according to claim 16 wherein the muffler body is configured to be arcuate wherein the curvature of the arcuate outer surface of the muffler conforms generally to the cross-sectional curvature of the fuselage, wherein the muffler is disposed crosswise within the fuselage, wherein the curved outer surface of the muffler is coincident with or recessed with respect to the curved exterior surface of the fuselage, wherein the curved outer surface of the muffler is recessed with respect to the exterior surface of the fuselage and wherein means are provided for redirecting air to flow over the curved outer surface of the muffler.

18. A muffler adapted to be fitted to a single cylinder engine, the muffler comprising a body having an interior chamber, a first end section, and a second end section, an outlet opening through which exhaust discharges from the muffler, the outlet opening being located between the first end section and the second end section, the first end section being adapted for mounting onto the engine with the interior chamber in communication with an exhaust outlet of the single cylinder engine to receive exhaust flow therefrom, wherein a resilient coupling mounts the second end section with respect to the engine, the resilient coupling providing a yielding resistance, such that the resilient coupling resists movement between the engine and the second end section when mounted thereto, the resilient coupling biasing the first end section into mating engagement with the engine.

19. A muffler comprising a body having an interior chamber and first and second end sections, an outlet opening through which exhaust discharges from the muffler, the outlet opening being located between the first end section and the second end section, a first mount for mounting the first end section onto an engine with the interior chamber in communication with an exhaust outlet of the engine to receive exhaust flow therefrom, and a second mount for mounting the second end section under a preload resisting movement of the second end section with respect to the engine, the second mount biasing the first end section into mating engagement with the engine at the first mount.

* * * * *